United States Patent
Punzo et al.

(10) Patent No.: US 11,994,983 B2
(45) Date of Patent: May 28, 2024

(54) MULTIMEDIA CARD COMMAND TIMEOUT MEASUREMENT

(71) Applicant: Micron Technology, Inc., Boise, ID (US)

(72) Inventors: Domenico Punzo, Volla (IT); Marco Di Pasqua, Naples (IT)

(73) Assignee: Micron Technology, Inc., Boise, ID (US)

( * ) Notice: Subject to any disclaimer, the term of this patent is extended or adjusted under 35 U.S.C. 154(b) by 92 days.

(21) Appl. No.: 17/894,591

(22) Filed: Aug. 24, 2022

(65) Prior Publication Data

US 2024/0070057 A1 Feb. 29, 2024

(51) Int. Cl.
*G06F 12/02* (2006.01)

(52) U.S. Cl.
CPC .... *G06F 12/023* (2013.01); *G06F 2212/1024* (2013.01)

(58) Field of Classification Search
None
See application file for complete search history.

(56) References Cited

U.S. PATENT DOCUMENTS

| | | | | |
|---|---|---|---|---|
| 2006/0161724 A1* | 7/2006 | Bennett | ............... | G06F 12/0246 711/E12.008 |
| 2008/0082728 A1* | 4/2008 | Traister | ............... | G06F 12/0246 711/170 |
| 2008/0086619 A1* | 4/2008 | Traister | ............... | G06F 12/0269 711/170 |
| 2009/0172286 A1* | 7/2009 | Lasser | ................ | G06F 12/0804 711/E12.001 |
| 2011/0078365 A1* | 3/2011 | Lin | ........................ | G06F 13/161 711/E12.001 |
| 2015/0234598 A1* | 8/2015 | Fujimoto | ............... | G06F 3/0679 711/102 |
| 2017/0308486 A1* | 10/2017 | Kotake | ................. | G06F 3/0635 |

* cited by examiner

*Primary Examiner* — William E. Baughman
(74) *Attorney, Agent, or Firm* — Schwegman Lundberg & Woessner, P.A.

(57) ABSTRACT

A memory card can include memory and a memory controller. The controller can receive a general command to increase the busy time of any subsequent access command Subsequently, the controller can receive an access command from a host to access the memory. The controller can then place the memory in a busy state for a time duration based on the general command, such that the memory refrains from processing read or write commands for the time duration. The timeout measure is the busy time between the time when the access command is issued and the host timeout.

20 Claims, 5 Drawing Sheets

MULTIMEDIA CARD COMMAND TIMEOUT MEASUREMENT

FIELD OF THE DISCLOSURE

Embodiments of the disclosure relate generally to memory devices. More specifically, embodiments relate to command timeouts for commands issued to a memory device.

BACKGROUND

Memory devices are typically provided as internal, semiconductor, integrated circuits in computers or other electronic devices. There are many different types of memory including volatile and non-volatile memory. Volatile memory can require power to maintain data and includes random-access memory (RAM), dynamic random-access memory (DRAM), and synchronous dynamic random-access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random-access memory (RRAM), and magnetoresistive random access memory (MRAM), 3D XPoint™ memory, among others.

Multiple devices can be combined to form a storage volume of a memory system, such as a solid-state drive (SSD), a Universal Flash Storage (UFS™) device, a MultiMediaCard (MMC) solid-state storage device, an embedded MMC device (eMMC™), etc.

A memory system can include one or more processors or other memory controllers performing logic functions to operate the memory devices or interface with external systems. The memory system can receive commands from a host in association with memory operations, such as read or write operations to transfer data (e.g., user data and associated integrity data, such as error data and address data, etc.) between the memory devices and the host, erase operations to erase data from the memory devices, or perform one or more other memory operations. The host will typically wait for a timeout period to elapse before taking remedial actions regarding the memory device.

However, information regarding the host timeout is not always available or is not readily available. Therefore, there is a general need for discovering command timeout values.

BRIEF DESCRIPTION OF THE DRAWINGS

The drawings, which are not necessarily drawn to scale, illustrate generally, by way of example, but not by way of limitation, various embodiments discussed in the present document.

DETAILED DESCRIPTION

The Joint Electron Device Engineering Council (JEDEC) has promulgated numerous interface and communication standards for embedded MultiMediaCard (eMMC™) devices, including the JEDEC standard D84-B51 (JESD84-B51), commonly referred to as JEDEC eMMC standard 5.1.

The present inventors have recognized, among other things, that it can be difficult to determine the maximum amount of time (e.g., "timeout") that a host will wait after sending a command to MMC devices. Further complicating this issue, the timeout can vary from manufacturer to manufacturer and from version to version, such that each MMC device may have different timeout management methods and parameters.

Figure 1:
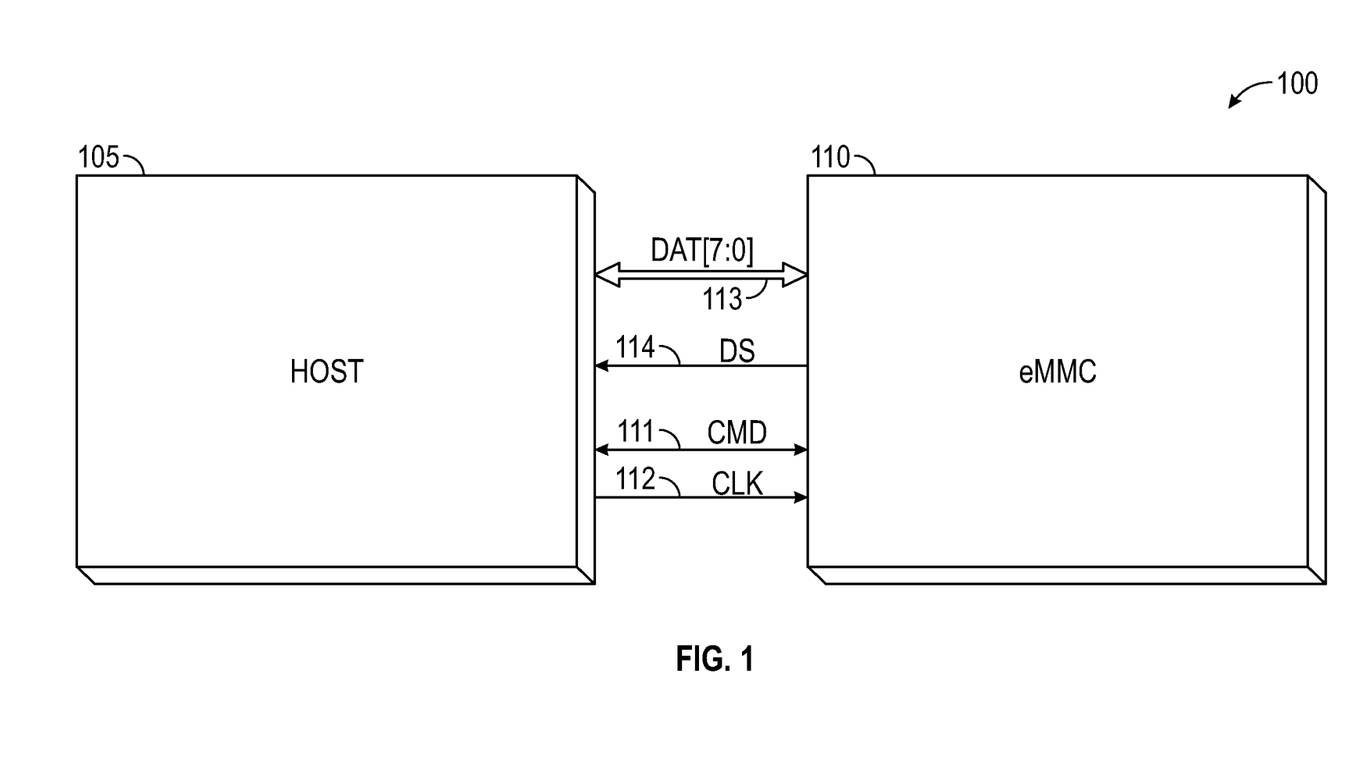
FIG. 1 illustrates an example system including a host and a memory device.

FIG. 1 illustrates an example system 100 including a host 105 and a memory device 110. The memory device 110 can include a non-volatile dual inline memory module, or eMMC, and will be referred to hereinafter as an eMMC for purposes of simplicity and clarity. The host 105 can include a host processor, a central processing unit, or one or more other processor or controller, such as in an electronic (or host) device. The host 105 and the eMMC 110 can communicate using a communication interface including one or more bidirectional command and data lines (e.g., a command line (CMD) 111, data lines (DAT[7:0]) 113, etc.), such as defined in one or more JEDEC standards. To synchronize communication of data between the eMMC 110 and the host 105, such as over the eight parallel data lines 113 illustrated in FIG. 1, the host 105 can provide a clock signal to the eMMC 110, for example, using a clock line (CLK) 112. In other examples, the communication interface can include one or more other lines (not shown), such as reset, power/voltage levels (e.g., VCC, VSS, etc.), etc.

Each of the host 105 and the eMMC 110 can include a number of receiver or driver circuits configured to send or receive signals over the communication interface (e.g., command, data, or one or more other lines, such as CMD, DAT[7:0], CLK, etc.), or interface circuits, such as data control units, sampling circuits, or other *intermedia* circuits configured to process data to be communicated over, or otherwise process data received from the communication interface for use by the host 105, the eMMC 110, or one or more other circuits or devices.

Figure 2:
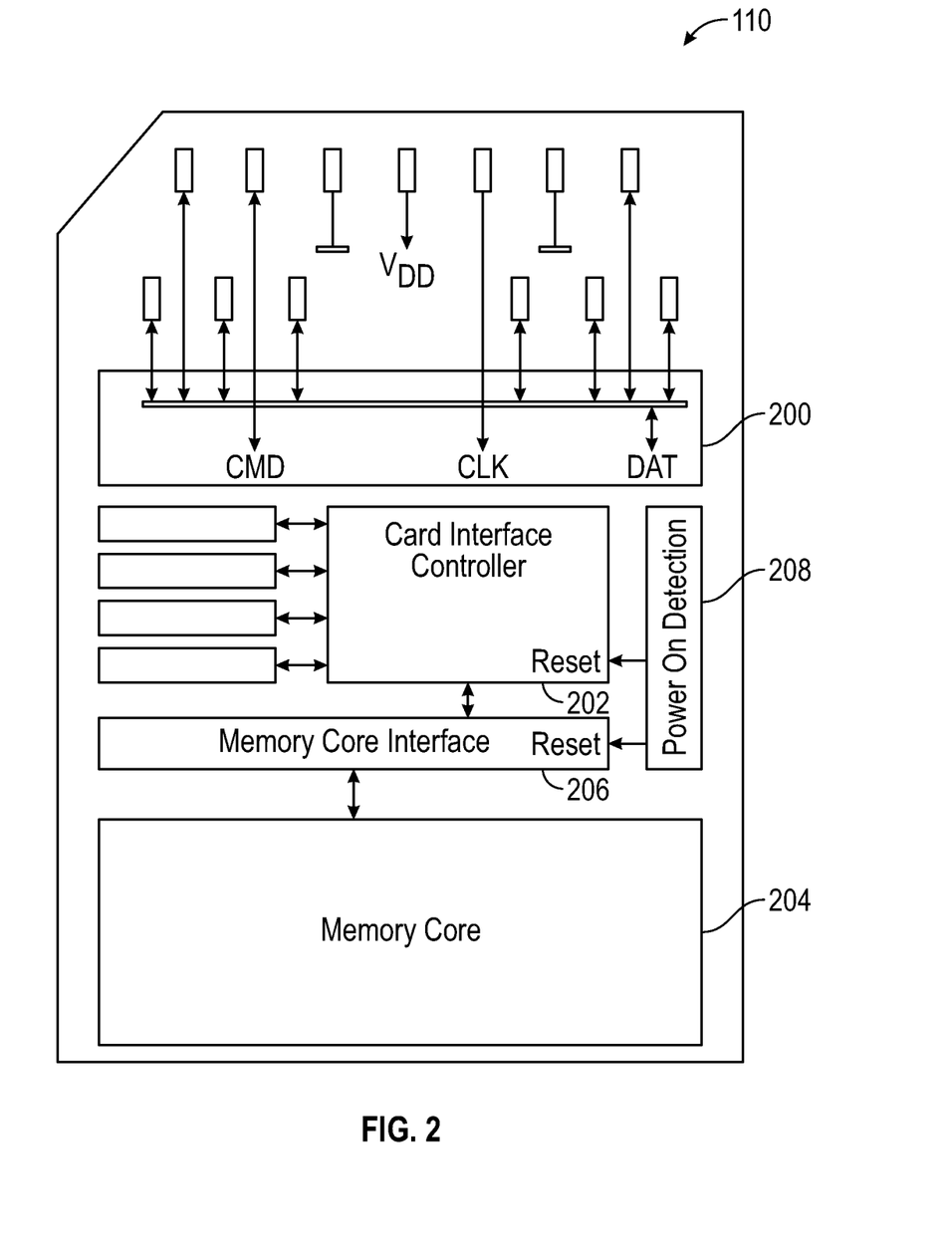
FIG. 2 illustrates further details of the memory device.

FIG. 2 illustrates further details of the memory device (e.g., the eMMC 110). Communication interface 200 provides communication to a host 105 (FIG. 1) using signals as described with reference to FIG. 1. Power supply VDD provides power to the cards. The controller 202 receives commands (e.g., an access command) from a host 105 (FIG. 1) to access the memory 204. An interface 206 can be provide between the controller 202 and the memory 204. The host may reset the card by switching the power supply off and back on and the memory device can include power detection system 208. To put the card into a defined state after the power-on.

The memory 204 can include a memory array (e.g., one or more arrays of memory cells, such as a NAND flash memory array, or one or more other memory arrays) and a memory controller. The memory controller 202 can include an application specific integrated circuit (ASIC), a field programmable gate array (FPGA), or one or more other processing circuits arranged or programmed to manage data transfers or operations to, from, or within the memory array.

Referring again to FIG. 1, in a read operation, the eMMC 110 can provide data (e.g., read data) from the memory array to the data lines 113 according to the clock signal on the clock line 112 from the host 105 (e.g., at rising edges of the clock signal, falling edges of the clock signal, or both rising and falling edges of the clock signal). Read operations can include single block read operations (e.g., CMD17) and multiple block read operations (e.g., CMD18). In a write operation, in a similar but reversed manner to the read operation, the eMMC 110 can receive data (e.g., write data) over the data lines 113 to write to the memory array. Write operations can include single block write operations (e.g., CMD24) and multiple block write operations (e.g., CMD25).

However, there is not a readily available way to determine when these commands have timed out. By having information regarding timeouts, the host 105 can detect when the eMMC 110 has entered an unresponsive state or a failure state, and the system 100 can receive notifications regarding a timeout condition. The host 105 or system 100 can attempt to recover by resetting the eMMC 110, cycling the power, or performing other operations.

In some current systems, command timeout is determined by viewing the host driver code for the system to determine timeout parameters for a particular host. However, the software code may not always be available for viewing.

Methods and systems according to embodiments address these and other concerns by computing or measuring the amount of time allowed by a host 105 to receive a response from the eMMC 110 after the host 105 issues a read or write command to the eMMC 110. This amount of time (timeout) can be measured by a "stuck busy" during an access command. This requires using a general command (e.g., GEN_CMD CMD56) that allows for setting a busy time for the following access command to an infinite value.

Figure 3:
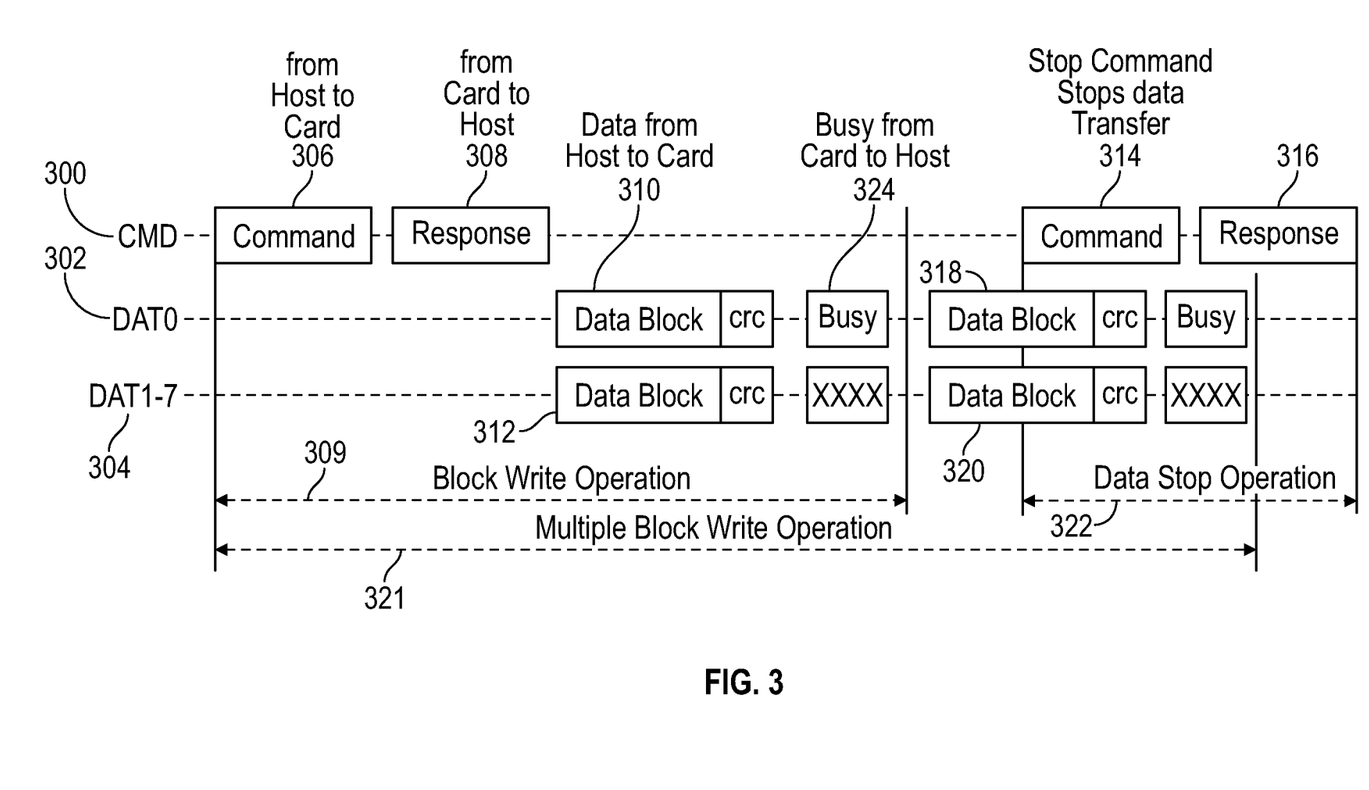
FIG. 3 illustrates use of a busy signal in a block write operation, in order to provide a contrast between a busy signal and the "stuck busy" signal of various embodiments.

FIG. 3 illustrates use of a busy signal in a block write operation. Similar diagrams can be provided for read operations, block read operations, and write operations; however, the block write operation is described herein because the block write operation best illustrates use of a busy signal provided from the eMMC 110 to the host 105.

A command signal (CMD) is shown at line 300. CMD is a bidirectional command channel used for card initialization and transfer of commands Commands are sent from the host 105 to the eMMC 110 and responses are sent from the card to the host. DAT0 signal 302 and DATA1-7 signal 304 are used for data transfer. Signal 302 can be used after power up or reset for data transfer, and a wider data bus using signal 304 can be configured for data transfer on signal 304 after power up or reset.

At block 306, a block write command (e.g., CMD25) is sent from the host 105 to the eMMC 110, and at block 308, the eMMC 110 provides a response to the host 105. These block writes can comprise block write operation 309. On the data lines 302 and 304, data blocks 310, 312 are sent form the host 105 to the eMMC 110 succeeded by CRC bits. The multiple block transmission is terminated when a stop command 314 follows on the CMD line 300, and a corresponding response 316 is sent from the eMMC 110 to the host 105. Multiple block write operations can occur at 318 and 320 throughout a time period 321, before the stop command 314 is transmitted to the eMMC 115. The data stop operation can comprise a time period 322.

The block write operation uses a simple busy signaling (at block 324) of the write operation duration on the data (DAT0) line 202. In some available systems, the response delays of the eMMC 115 can vary, and polling the busy signal is needed to determine whether the eMMC 115 is busy. In example embodiments, this busy signal at block 324 is increased to a value greater than the host timeout (e.g., infinite) to determine the host timeout. The point at which timeout occurs can then be determined to be the actual timeout of the host 105, without the need to examine host driver code to find timeout values.

Figure 4:
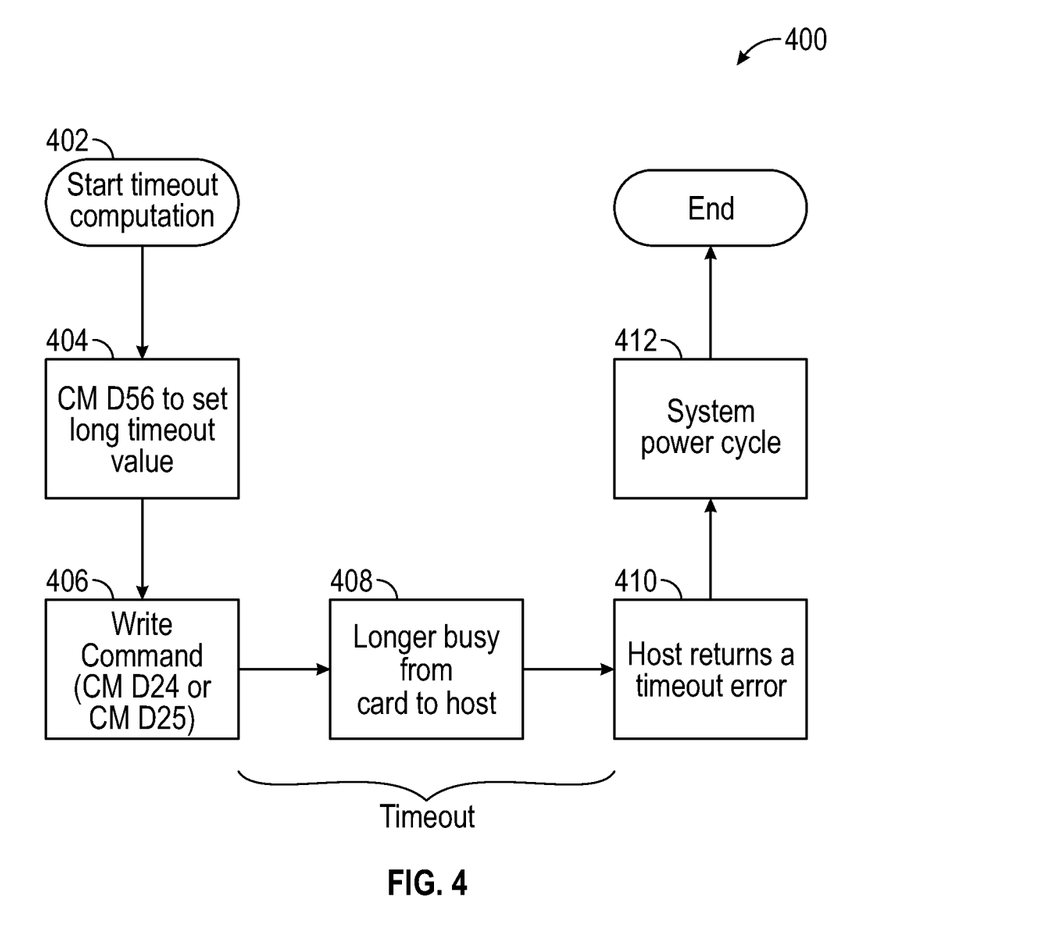
FIG. 4 illustrates a method that supports determining command timeout in accordance with aspects of the present disclosure.

FIG. 4 illustrates a method 400 that supports determining command timeout in accordance with aspects of the present disclosure. The method 400 can be performed by components described above with reference to FIGS. 1 and 2. For example, some operations can be performed by the host 105 or the eMMC 115, or by the controller 202.

The timeout computation can be started at operation 402 with a reboot, change in the eMMC 115, or upon request of the host 105, for example.

At operation 404, the host 105 can generate a long timeout command to set a long timeout value (e.g., for putting the eMMC 115 in a "stuck busy" state) for access commands. The time duration indicated by this timeout value can be based on a manufacturer-specified timeout for a read operation for a host device (e.g., host 105) connected to the memory card. In some examples, the time duration can be incrementally longer than the manufacturer-specified timeout. For example, if the manufacturer-specified timeout is 10 seconds, the time duration can be 11 seconds, or 11.5 seconds. The controller 202 can receive the long timeout command from the host 105.

At operation 406, the controller 202 can receive an access command from a host 105 to access the memory 204. The access command can include one of a command to read a single sector, a command to read multiple sectors, a command to write a single sector, or a command to write multiple sectors. Responsive to receiving the access command, the controller 202 can place the memory 204 in a busy state for a time duration based on operation 404. In this manner, in operation 408, the memory 204 is in a longer (or "stuck busy") busy state, such that the memory 204 refrains from processing read or write commands for the time duration. The memory 204 can continue to perform some commands, for example hardware platform interface (HPI) commands and other commands.

At operation 410, the host 105 will timeout, and the access command timeout can be determined based on the time duration. In examples, the command timeout used by the host for the eMMC 115 is about equal to the amount of time it took for the host 105 to time out waiting for a response to the access command provided in operation 406.

At operation 412, the system 100 can power cycle and reboot, having knowledge of command timeouts for subsequent memory access commands. In some examples, the controller 202 or the host 105 can provide a reset command to reset the memory card and to operate the memory card based on the command timeout corresponding to the access command.

Figure 5:
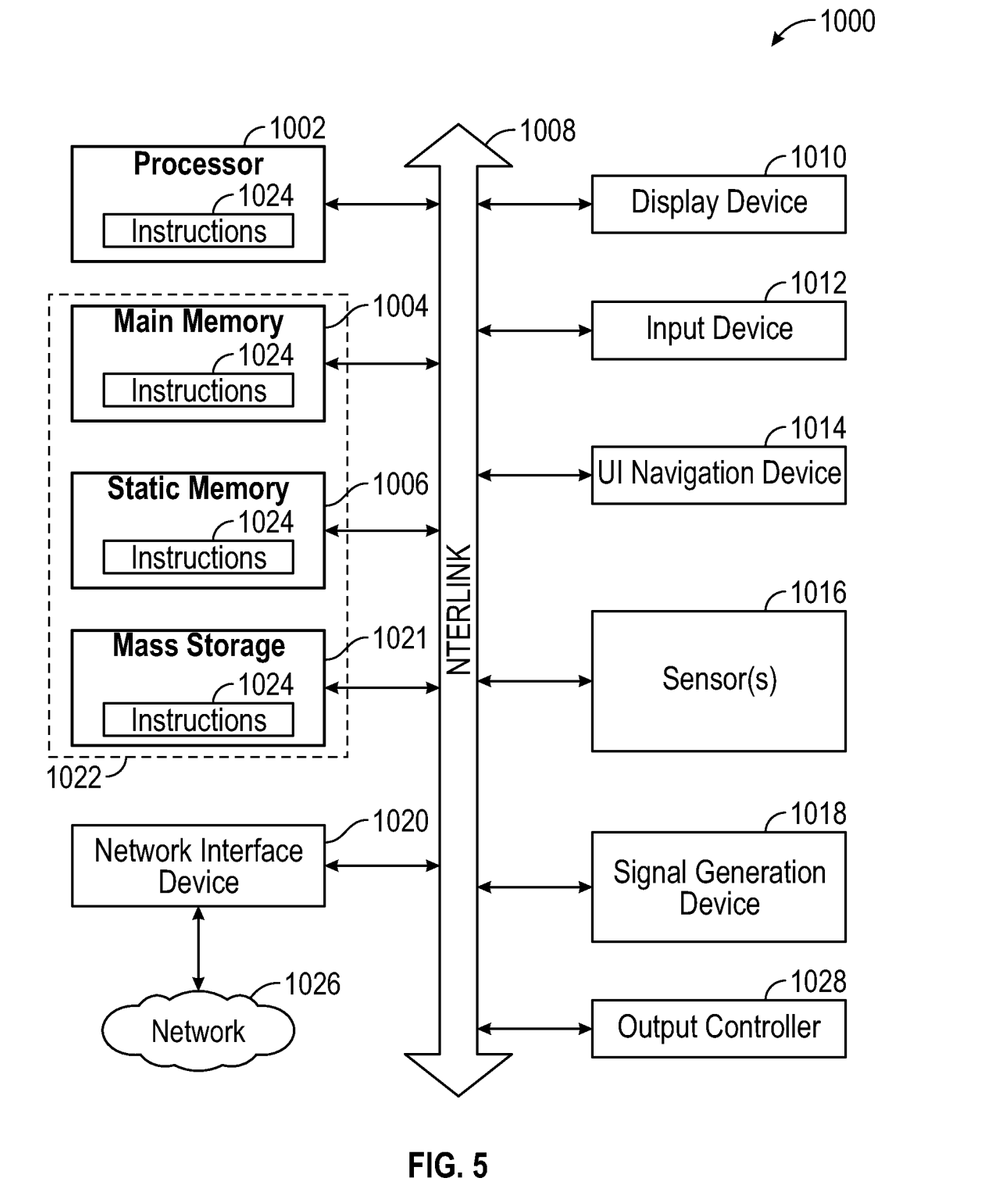
FIG. 5 illustrates a block diagram of an example machine upon which any one or more of the techniques (e.g., methodologies) discussed herein may perform.

FIG. 5 illustrates a block diagram of an example machine 1000 upon which any one or more of the techniques (e.g., methodologies) discussed herein may perform, such as computing or determining command timeout for commands provided to multimedia cards. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 1000 (e.g., the host 105, the non-volatile dual in-line memory module (NVDIMM) 110, etc.) may include a hardware processor 1002 (e.g., a central processing unit (CPU), a graphics processing unit (GPU), a hardware processor core, or any combination thereof, such as a memory controller, etc.), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a signal generation device 1018 (e.g., a speaker), a network interface device 1020, and one or more sensors 1016, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The machine 1000 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the mass storage 1021 may constitute the machine-readable medium 1022.

While the machine-readable medium 1022 is illustrated as a single medium, the term "machine-readable medium" may include a single medium or multiple media (e.g., a centralized or distributed database, or associated caches and servers) configured to store the one or more instructions 1024.

The term "machine-readable medium" may include any medium that is capable of storing, encoding, or carrying instructions for execution by the machine 1000 and that cause the machine 1000 to perform any one or more of the techniques of the present disclosure, or that is capable of storing, encoding, or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 (e.g., software, programs, an operating system (OS), etc.) or other data are stored on the storage device 1021, can be accessed by the memory 1004 for use by the processor 1002. The memory 1004 (e.g., DRAM) is typically fast, but volatile, and thus a different type of storage than the storage device 1021 (e.g., an SSD), which is suitable for long-term storage, including while in an "off" condition. The instructions 1024 or data in use by a user or the machine 1000 are typically loaded in the memory 1004 for use by the processor 1002. When the memory 1004 is full, virtual space from the storage device 1021 can be allocated to supplement the memory 1004; however, because the storage 1021 device is typically slower than the memory 1004, and write speeds are typically at least twice as slow as read speeds, use of virtual memory can greatly reduce user experience due to storage device latency (in contrast to the memory 1004, e.g., DRAM). Further, use of the storage device 1021 for virtual memory can greatly reduce the usable lifespan of the storage device 1021.

In contrast to virtual memory, virtual memory compression (e.g., the Linux™ kernel feature "ZRAM") uses part of the memory as compressed block storage to avoid paging to the storage device 1021. Paging takes place in the compressed block until it is necessary to write such data to the storage device 1021. Virtual memory compression increases the usable size of memory 1004, while reducing wear on the storage device 1021.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1000, and includes digital or analog communications signals or other intangible medium to facilitate communication of such software.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "an example aspect", "some aspects", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to and are not intended to imply that the objects so described must be in a given sequence, either temporally, spatially, in ranking, or in any other manner.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting and/or the action of receiving. In one example, the phrase "communicating a signal" may refer to the action of transmitting the signal by a first device and may not necessarily include the action of receiving the signal by a second device. In another example, the phrase "communicating a signal" may refer to the action of receiving the signal by a first device and may not necessarily include the action of transmitting the signal by a second device.

As used herein, the term "circuitry" may, for example, refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, circuitry may include logic, at least partially operable in hardware. In some aspects, the circuitry may be implemented as part of and/or in the form of a radio virtual machine (RVM), for example, as part of a Radio processor (RP) configured to execute code to configured one or more operations and/or functionalities of one or more radio components.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The above detailed description includes references to the accompanying drawings, which form a part of the detailed description. The drawings show, by way of illustration, specific aspects in which the invention can be practiced. These aspects are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description, with each claim standing on its own as a separate aspect, and it is contemplated that such aspects can be combined with each other in various combinations or permutations. The scope of the invention should be determined with reference to the appended claims, along with the full scope of equivalents to which such claims are legally entitled.

What is claimed is:

1. A memory card comprising:
   a memory; and
   a controller configured to:
      receive a command to set a long command busy time;
      subsequent to receiving the command to set the long command busy time, receive an access command from a host to access the memory;
      responsive to receiving the access command, place the memory in a busy state for a time duration based on the command to set the long command busy time, such that the memory refrains from processing read or write commands for the time duration; and
      determine a command timeout based on the time duration.

2. The memory card of claim 1, wherein the time duration is based on a manufacturer-specified timeout for a read operation for a host device connected to the memory card.

3. The memory card of claim 2, wherein the time duration is incrementally longer than the manufacturer-specified timeout.

4. The memory card of claim 1 wherein, subsequent to receiving the access command, the host is configured to:
   monitor communication from the memory card to detect a command timeout; and
   determine a command timeout value corresponding to the access command based on an indication that the access command has timed out.

5. The memory card of claim 4, wherein the host is configured to:
   provide a reset command to reset the memory card and to operate the memory card based on the command timeout corresponding to the access command.

6. The memory card of claim 1, wherein the access command includes one of a command to read a single sector, a command to read multiple sectors, a command to write a single sector, or a command to write multiple sectors.

7. The memory card of claim 1, wherein the memory continues to process hardware platform interface (HPI) commands for the time duration.

8. The memory card of claim 1, wherein the memory card comprises a managed NAND.

9. The memory card of claim 8, wherein the managed NAND comprises an embedded MMC (eMMC).

10. A system including:
    a host device; and
    a memory card coupled to the host device, the memory card comprising:
       a memory; and
       a controller configured to:
          receive a general command to set a long command busy time;
          subsequent to receiving the general command, receive an access command from a host to access the memory;
          responsive to receiving the access command, place the memory in a busy state for a time duration based on the long command busy time, such that the memory refrains from processing read or write commands for the time duration; and
          determine a command timeout based on the time duration.

11. The system of claim 10, wherein the time duration is based on a manufacturer-specified timeout for a read operation or a write operation for the host device.

12. The system of claim 11, wherein the time duration is incrementally longer than the manufacturer-specified timeout.

13. The system of claim 10 wherein, subsequent to receiving the access command, the host is configured to:
    monitor communication from the memory card device to detect a command timeout; and
    determine a command timeout value corresponding to the access command based on an indication that the command has timed out.

14. The system of claim 13, wherein the host is configured to:
    provide a reset command to reset the memory card and to operate the memory card based on the command timeout corresponding to the access command.

15. The system of claim 10, wherein the access command includes one of a command to read a single sector, a command to read multiple sectors, a command to write a single sector, or a command to write multiple sectors.

16. The system of claim 10, wherein the memory card comprises a managed NAND.

17. The system of claim 16, wherein the managed NAND comprises an embedded MMC (eMMC).

18. A method for determining command timeouts for memory access commands, the method comprising:
   receiving a general command to set a long command busy time value for access commands;
      subsequent to receiving the general command, receiving a memory access command;
      responsive to receiving the memory access command, placing a memory device in a busy state for a time duration based on the long command busy time value, such that the memory device refrains from processing read or write commands for the time duration; and
   determining a command timeout based on the time duration.

19. The method of claim 18, wherein the time duration is based on a manufacturer-specified timeout for a read operation or a write operation for a host device connected to the memory device.

20. The method of claim 18, further comprising:
   monitoring communication from a host to detect a command timeout indication of the host; and
   determining a command timeout corresponding to the memory access command based on the command timeout indication.

* * * * *